June 21, 1966  S. R. BARNETTE  3,257,484
PLASTIC ARTICLES HAVING ISOTROPIC PROPERTIES
AND METHODS OF MAKING SAME
Filed Jan. 14, 1963  2 Sheets-Sheet 1

INVENTOR.
BY Stanley Ronald Barnette

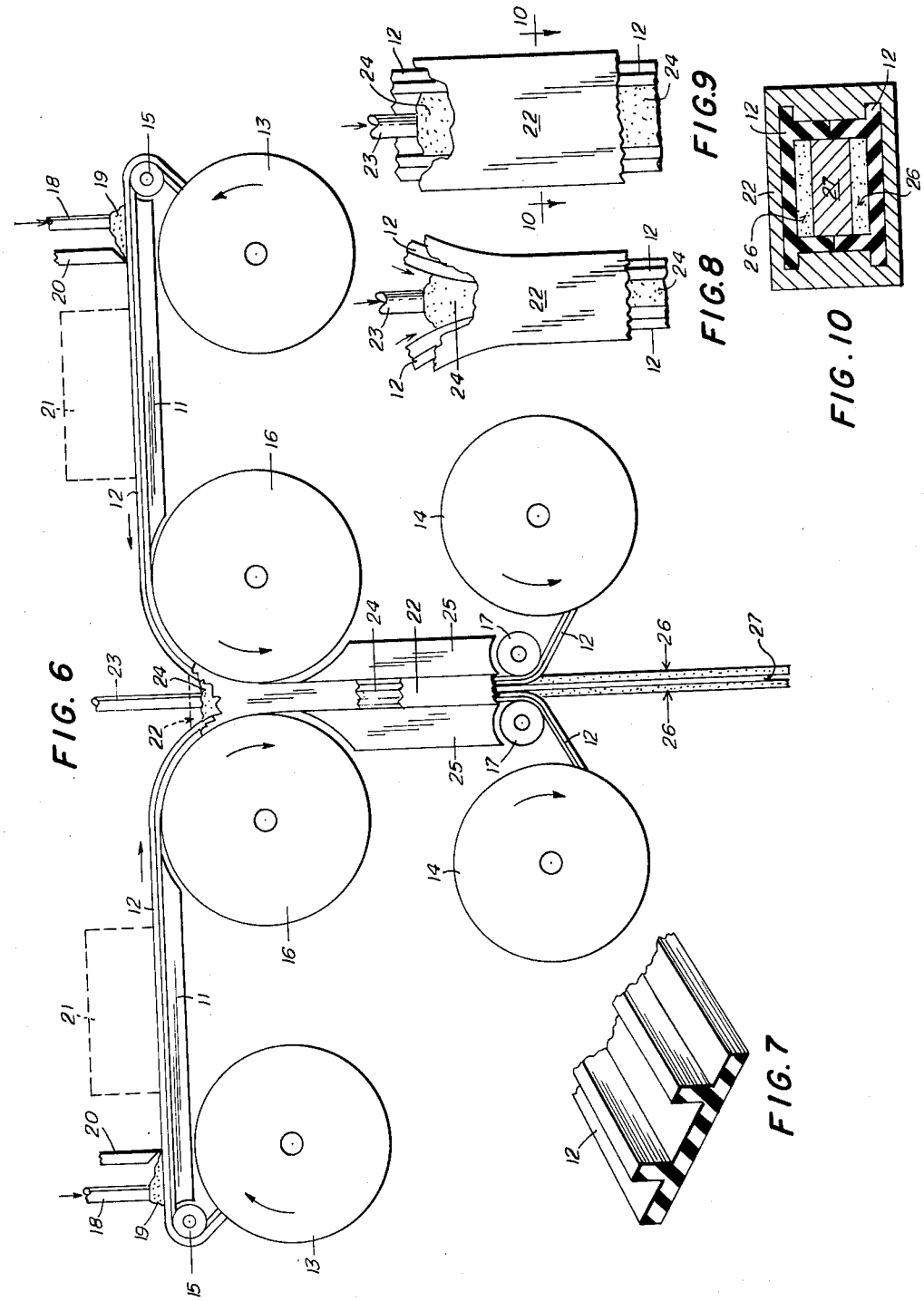

United States Patent Office 3,257,484
Patented June 21, 1966

3,257,484
PLASTIC ARTICLES HAVING ISOTROPIC PROPERTIES AND METHODS OF MAKING SAME
Stanley Ronald Barnette, 90 Cherokee St., Miami Springs, Fla.
Filed Jan. 14, 1963, Ser. No. 254,848
11 Claims. (Cl. 264—47)

This application is a continuation-in-part of my copending application, Serial No. 808,599, filed April 24, 1959, now U.S. Patent No. 3,072,973.

This invention relates to a process for producing plastic articles having isotropic properties.

Another object of this invention is to provide surfacing material, in sheet or panel form, comprising a plastic body with or without core, filler or reinforcement.

Actually, four basic methods are employed in the basic manufacturing of individual sheets: casting, extrusion, compression molding and calendering.

Casting, as is conventional, is a method of pouring in one operation a liquid monomer or resin into a cell mold, generally between two polished plate glass sheets separated with a gasket seal. This mold is then cured in an oven to convert the monomer or resin into a polymer solid.

Extrusion uses powder or granular resins that are fed through a hopper into a heated barrel where it is melted by heat and worked by a continuously revolving screw and said screw forces the hot melt forward through a heating chamber and out through a shaping orifice or die. As the plastic sheet is forced out it cools as it is conveyed to the hardening stage.

Compression molding is a process wherein the molding compound, generally preheated, is placed in the open mold cavity, the mold is closed, and heat and pressure, in the form of a downward moving ram, are applied until the material has cured.

Calendering is a method to prepare sheets of material by pressure between two or more counter-rotating rolls.

Said methods require accurate and precise controls or tolerances in order to lessen the many defects that may be found in the finished product.

Some of these defects are:
(1) Orientation stresses caused by forced alignment of the molecules.
(2) Thermally-induced stresses resulting from non-uniform cooling in the mold.
(3) Differences in permeability as a consequence of non-uniform crystallinity by the rapid cooling (quenching).
(4) Different molecular weight distribution with the same molecular average.
(5) Deformation under load (cold-flow).
(6) Anisotropic properties.

The sources of these defects are complex but, mainly reside in the changes that are induced in the resin properties by the application of different forces and heating and or cooling cycles during the different steps of each process.

The complex behavior of plastics responsible for the defects found in the finished products has not fully been established and it is not intended that this application will explain fully the possible sources of those defects, but some hypotheses and theories are presented below, to possibly avoid some common defects found in plastic articles manufactured using conventional techniques.

It is predictable that all resins irrespective of their viscosity value, but because of pressure gravity and elastic and inertial forces in the resin itself will tend to concentrate at the bottom at the tangential point of contact with the horizontal surface.

Applicant has discovered that resins, particularly thermosetting resins cast and cured in place in an open mold, without the use of any source of artificial heat or pressure, the bottom of the mold being approximately horizontal, cure from the bottom upward. Normally the upper portion, in contact with the air, cures at a different rate than the bottom portion. It is also known that different portions of cast synthetic resin articles may differ in properties. Thus, when a liquid resin is cast in an open mold having a horizontal bottom, and is cured in the open mold, the bottom portion of the resulting article has been found to differ substantially from other portions in strength. Differences in flexural strength and tensile strength between the portions of the articles are commonly as great as about 15% to 35%. The bottom portion of the article may show higher molecular concentration and consequently higher polymerization values, more crystallinity, and less permeability than other portions. Another fact to be considered in the polymerization of bodies of liquid resin is hydrostatic pressure, causing greater compressive forces to be exerted upon the liquid at the lower levels of such liquid.

This comparison is valid only with liquid resins but, where solid resins are melted and are extruded or formed by methods requiring flow during the process, if the flow is too slow the possibility exists of different portions of the article having varying properties and if the flow during molding is too rapid and is accompanied by fast chilling, the shear stresses set up during flow can be frozen in the article. Other disadvantages in melting solid resins and then forming the melt are that the low thermal conductivity and high viscosity of plastic melts makes it difficult to transmit heat through them rapidly, and it is very difficult to create any turbulence or mixing action in them to achieve a perfect homogeneity.

One possible reason for some of the differences is that air in contact with the upper portion of the liquid composition affects the rate of cure of that portion. Additionally, it is postulated that there is a difference in molecular concentration or of molecular weight distribution, which again could be related to contact with air, or to gravity and the resulting hydrostatic pressure, or to the contact of the resin with the horizontal surface of the mold.

It is also of interest to note a possible relationship to crystallization processes. Thus, superior crystals may be formed when crystallization is carried out over the proper time interval. When faster crystallization is induced by accelerating means, under some conditions the crystals are small or irregular and at times the product is amorphous.

This comparison is valid only with liquid resins, but whenever solid resins are melted, during the viscosity stage, the possibilities of higher molecular concentration and better crystallinity at the bottom level must not be neglected. This is important because if the flow during the molding is too slow, these possibilities may increase and, if the flow during molding is rapid and is accompanied by fast chilling, the shear stresses set up during flow can be frozen in the article.

It is important to observe that in casting a laminated sheet comprising a lamination of, for example, wood or composition board and plastic, the insert must be covered on both sides by equal thicknesses of outer plastic laminations to avoid warpage of the completed product.

One purpose of this invention is to take advantage of well known properties of plastics, and possibly other, less well known or unknown, properties thereof, in order to lessen and possibly avoid some common defects found in plastic articles manufactured using conventional techniques.

It is known that resins, particularly thermosetting resins cast and cured in place in an open mold, without the use of any source of artificial heat or pressure, the bottom of the mold being approximately horizontal, cure from the bottom upward. Normally the upper portion, in contact with the air, cures at a different rate than the bottom portion. It is also known that different portions of cast synthetic resin articles may differ in properties. Thus, when a liquid resin is cast in an open mold having a horizontal bottom, and is cured in the open mold, the bottom portion of the resulting article has been found to differ substantially from other portions in strength. Differences in flexural strength and tensile strength between the portions of the article are commonly as great as about 15% to 35%. The bottom portion of the article may show higher polymerization values, more crystallinity, and less permeability than other portions. Another fact to be considered in the polymerization of bodies of liquid resin is hydrostatic pressure, causing greater compressive forces to be exerted upon the liquid at the lower levels of such liquid.

Where molten resins are extruded or formed by methods requiring flow during molding, if the flow is too slow the possibility exists of different portions of the article having varying properties and if the flow during molding is too rapid and is accompanied by fast chilling, the shear stresses set up during flow can be frozen in the article. Other disadvantages in melting solid resins and then forming the melt are that the low thermal conductivity and high viscosity of plastic melts makes it difficult to transmit heat through them rapidly, and it is very difficult to create any turbulence or mixing action in them to achieve a perfect homogeneity.

Various theories and hypotheses may be advanced in an attempt to explain the reasons for the common defects found in plastics, and such theories and hypotheses are discussed below. They are offered for what light they may shed upon the problems involved and solutions thereto, and it is not intended that the claims or the invention is to be limited in any way to such theories.

One possible reason for some of the differences is that air in contact with the upper portion of the liquid composition affects the rate of cure of that portion. Additionally, it is postulated that there is a difference in molecular concentration or of molecular weight distribution, which again could be related to contact with air, or to gravity and the resulting hydrostatic pressure, or to the contact of the resin with the horizontal surface of the mold.

It is also of interest to note a possible relationship to crystallization processes. Thus, superior crystals may be formed when crystallization is carried out over the proper time interval. When faster crystallization is induced by accelerating means, under some conditions the crystals are small or irregular and at times the product is amorphous.

This invention provides means whereby resins having undesirable properties may be used in a given physical arrangement so as to produce articles bearing superior characteristics to those of article produced by other conventional methods.

To illustrate some of the above theories and problems an example of a conventional process will suffice. In casting by conventional methods, one sheet of 5' x 10' is formed between two sheets of plate glass; after the liquid monomer is introduced in the cell it is placed in the oven for curing, in a vertical position, along its 10' length. The bottom level of the liquid monomer will be subjected to the total weight of the resin within the cell and consequently is compressed to that extent while the uppermost level will be free of resin weight and is only in contact with the glass and gasket seal. It will be very easy to figure out the pressure at the bottom level, considering that in a fluid of uniform density at rest acted upon by gravity alone, the pressure increases with depth. In other words, when two points of the same matter are subjected to different pressures during the forming process said differences must be present within the end product.

This novel process permits the manufacturing of plastic sheets and panels, formed in a predetermined physical arrangement so as to insure substantially isotropic characteristics at the opposite surfaces of said sheets and panels.

Another feature of the invention is the provision of apparatus for carrying out the process.

In accomplishing this method, two equal plastic skins or layers are formed at the same time under the same conditions and using the same plastic components on two identical horizontal surfaces provided by two identical open top mold assemblies and the plastic layers or skins are permitted to harden to a certain degree.

It will be unquestionable that both plastic layers of skins formed will have the same hardness, compression or expansion ratio, the same inherent defects, if any, in the same opposed relative location, and, if bonded together in the proper physical arrangement according to the invention, a substantially balanced parallel rigidity.

Because the forming of these layers or skins will be carried out in the proper time, without any excessive heat and with no artificial pressure, the polymerization will take place without any disturbing force or orientation stresses caused by forced alignment of the molecules, with negligible or no thermally-induced stresses from non-uniform cooling, with negligible or no differences in permeability, with negligible or no different molecular weight distribution with the same molecular weight average and other possible defect will be negligible and in all instances, both surfaces will have the same characteristics and any defect present within the layers or skins will be evenly distributed along the plastic body of said layers or skins.

Furthermore, as soon as both plastic layers or skins are bonded together, their identical internal and surfacing structure will add to the balanced rigidity of the complete article, because the resultant of the compression, expansion and flexural forces will be the same.

The bonding of both plastic layers or skins is also accomplished in a steady procedure, without any artificial pressure or without any excessive heat, because the bonding will be provided by the properties of molecular cohesion or adhesion. Thus, the two plastic layers or skins are vertically positioned and disposed so that the upper portion of said plastic layers or skins as formed on the horizontal mold will be contiguous in the vertical position, forming a cavity therebetween with the surrounding gasket seal. A bonding material is introduced into said cavity and it is permitted to harden.

Summarizing, this new method in one simple example may be carried out following these steps:

(1) Laying two equal predetermined quantities of polymerizable liquid resin into two equal horizontal or leveled molds, formed by two surfaces limited by gasket seals disposed on a hinged base, said gaskets of a height such that when fitted together will represent the total width of the desired sheet or panel and having an uppermost slot or hole previously machined in one or both of said gaskets;

(2) Leveling if necessary said quantities of liquid resin to conform to the shape of the gaskets and to form a layer or skin and permitting said resin to harden to a certain degree;

(3) Rotating both horizontal mold assemblies, having therein the formed layers or skins toward one another, to a 90 degree angle or vertical position, so that said layers or skins will be in parallel planes one to the other, referring to the faces that were in contact with the mold surface when formed in the horizontal position. Suitably, the two mold assemblies are hinged, to corresponding bases mounted on a leveled platform, said bases having means to align and position said plastic molds in close contact and the mold assemblies having means to align the layers or skins to insure parallelity;

(4) Having aligned and positioned said plastic layers or skins, a predetermined cavity will be formed limited by the inner surface of said plastic layers or skins and by the surrounding gaskets portions, having an uppermost hole or slot;

(5) Introducing by means of said uppermost hole or slot, a predetermined quantity of polymerizable liquid resin, bonding material, filler mixture, or reinforcing mixture, to fill the cavity;

(6) Permitting the introduced material to bond to the plastic layers or skins to harden, and removing the sheet or panel from the molds.

These simple steps involve the method to produce two layers or skins bonded together by means of a bonding material, but other variations will permit forming more self-bonding perfect physically arranged sheets or panels, wherein a plurality of layers is formed in each mold by successive steps until a given thickness is achieved and then the mold is rotated and said pair of plastic bodies are bonded together.

Furthermore, this method permits the bonding or enveloping of a core or forming said core into said cavity, following these steps:

(a) To bond a core, a core slightly narrower in thickness than said cavity is introduced in said cavity edge-wise, forming two substantially identical resultant cavities on both face sides and on two edge sides of said core and introducing the bonding material or resin to completely fill said cavities.

(b) To envelope a core, a predetermined quantity of liquid resin or bonding material is introduced in the cavity to a partial depth of said cavity and permitted to harden, another quantity of liquid resin or bonding material is introduced on top of said cured plastic or hardened bonding material and a slab core slightly narrower in thickness and slightly narrower in length and width than said cavity, is introduced edge-wise on top of said liquid. Said core displaces the last poured liquid resin or bonding material so as to rise through and permeate the inner sides of the plastic layers or skins and the core and flow to a predetermined level to completely envelope the core. If necessary additional liquid resin or bonding material to completely envelope the core is introduced.

(c) To form a core within said cavity, in one embodiment a foamed resin with catalyst and blowing agent is introduced to a partial depth of said cavity, and is permitted to expand, cure and bond to the adjacent plastic layers or skins.

Finally, a further object of this invention is to add pigmented coloring to the liquid resin or introduce decorative media in order to form a decorative effect in at least one of the liquid resin layers poured into the open top molds.

Also, it is possible to obtain different surface finishes of the articles, using molds having bottoms conforming to the desired exterior surface finish of the article such as textured, sculptured, etched, engraved, satin, highly polished, etc.

Instead of using the same liquid resin that was used to form the layers or skins, different bonding materials or mixtures and/or reinforcing means may be employed by introduction between the layers or skins in order to increase rigidity, flexibility, shock-proof properties, lightness in weight, etc., to wit:

*Rigidity*: Solid core material such as metal, wood, fiberglass, mat, honeycomb fillers;

*Flexibility*: Flexible resins, rubber impregnated or cured into the cavity;

*Shock-proof*: Foamed plastic impregnated or formed into the cavity, rubber impregnated or cured into the cavity;

*Light-weight*: Foamed plastic impregnated or formed into the cavity, light fillers mixed with the resin;

*Acoustical and thermal insulation*: Honeycomb, foamed plastic impregnated or formed into the cavity;

*Coloring*: Pigments mixed with resin or bonding materials to form the background for the decorative effect.

This method provides means to produce any desired thickness, and any shape such as square, rectangular, oval, round, or irregular, depending only on the contours of the molds used.

Finally, this method can be accomplished in continuous operation as will be disclosed in the explanation of FIGURES 6 through 10.

In the drawings:

FIGURE 6 is a diagrammatic showing of an apparatus useful in carrying out the process continuously.

FIGURE 7 is a view in perspective of a portion of the flexible conveyor type of mold used in connection with the continuous process.

FIGURES 8, 9 and 10 are three different views of the funnel-like section of the apparatus depicted in FIGURE 6.

With reference to the drawings the instant invention will now be described.

Figure 1:
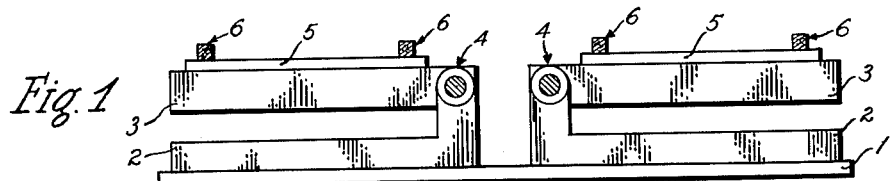
FIGURE 1 is a side view of the two mold assemblies and a cross-sectional view of the two open top molds attached to said mold assemblies, used for manufacturing articles according to this invention.

FIGURE 1 depicts two identical mold assemblies comprising two attached sections 2 and 3 hinged one to the other by means of shafts and bearings 4. The lower sections of said mold assemblies 2 rest on a leveled platform 1 and the upper sections of said mold assemblies 3 have means to maintain a horizontal position and means to rotate and secure said upper sections in the vertical position not shown in the figure.

On top of the upper sections of said mold assemblies 3, mold plates 5 and mold walls comprising a flexible gasket 6 are attached, forming two identical open top molds. The surfaces of the mold plates 5 correspond to the bottom of the open top molds and have the desired exterior surface finish of the article. The mold plates may consist of glass, melamine type plastic, polyester film, etc.

Figure 2:
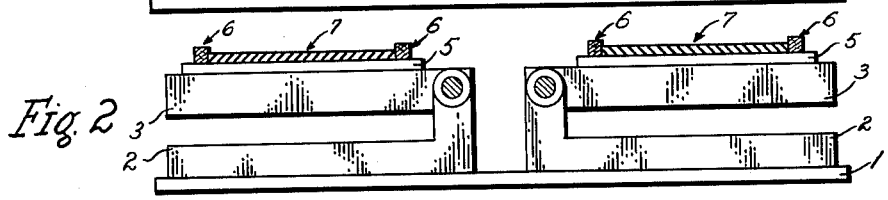
FIGURE 2 is another similar view to FIGURE 1 illustrating the first basic step of the process.

As soon as both open top molds are assembled and aligned if necessary they are coated with a release and two identical predetermined quantities of liquid catalyzed modified resin are introduced in the molds, one in each mold to a partial depth of said molds forming two identical liquid layers 7 illustrated in FIGURE 2.

Figure 3:
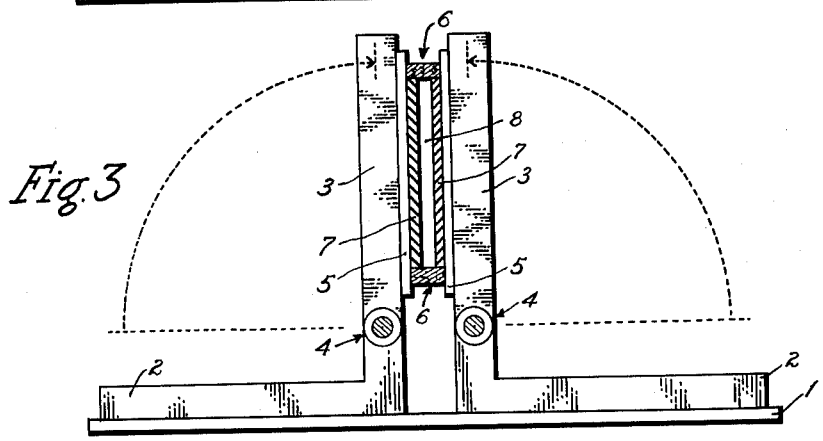
FIGURE 3 is a side view of the rotation of the upper mold sections of the mold assemblies as a second basic step of the process.

After these two liquid resins are permitted to harden to a certain degree both upper sections of the mold assemblies 3 are rotated to a 90° angle as indicated in FIGURE 3 so that the mold wall gaskets 6 of both open molds come in close contact forming a leak-proof space cavity 8, said cavity being limited by the inner surfaces of the plastic layers 7 and a portion of said gaskets.

The size of the resultant cavity 8 has previously been determined considering the total thickness of the article and is provided by the combined height of the gaskets that form the mold walls and the total level of resin introduced in both molds.

After the two upper sections of the mold assemblies 3 are secured in the vertical position, the sections are placed in operative relationship as by means provided in at least one of the lower sections of the molds 2 to move the entire assembly along the leveled platform in a backward or forward direction. The two open molds are put together and the corresponding mold wall gaskets become in close contact, with a slight pressure, thus forming the leak-proof cavity 8.

Also the two upper sections 3 of the mold assemblies have means to secure and align the attached molds so that the two finished surfaces of the article will be in parallel planes one to the other.

Figure 4:
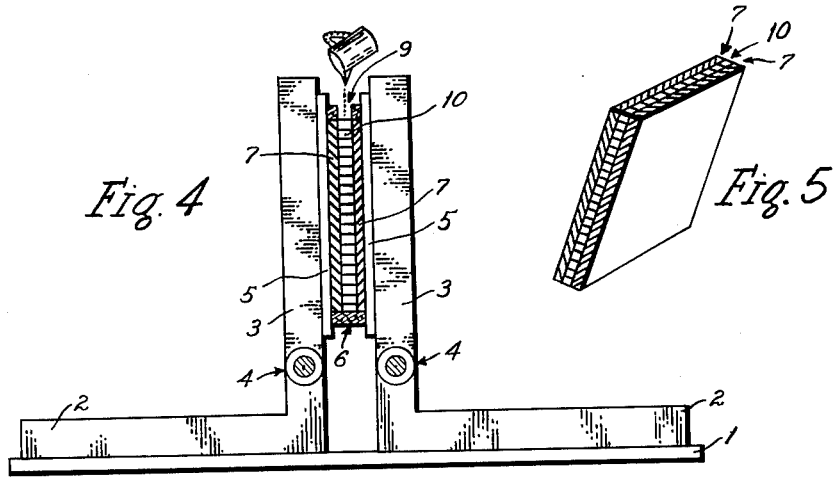
FIGURE 4 is another similar view to FIGURE 3 depicting the last basic step of the process.

After the molds are aligned the upper gaskets 6 or a portion of same may be removed in order to introduce the liquid catalyzed modified resin 10 into the cavity 8 as indicated in FIGURE 4.

Figure 5:
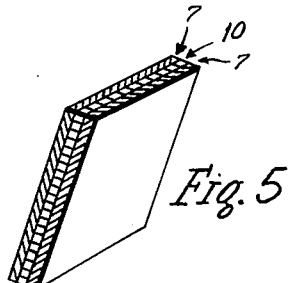
FIGURE 5 illustrates a plastic sheet produced by means of the methods described in this invention.

After this last resin is poured and is permitted to cure until set, the article may be removed from the molds and will have the appearance of a seamless solid plastic article with two finished surfaces formed by two outer skins or layers 7 self-bonded to a central layer 10, as illustrated in FIGURE 5, having isotropic properties as a result of the counter-balance of equal opposite stresses.

This article may be wholly transparent, translucent, partially transparent, clear, colored or opaque, depending on the kind and amount of dye or pigment added to the liquid resin. A combination of effects or colors in each layer is readily achieved.

Whenever a deep three-dimensional decorative effect is desired in the article this may be achieved in one or both outer layers by means of different techniques utilizing orientable media such as:

Mixing one amount of pearlescent pigment with the liquid catalyzed modified resin and pouring said mixture into the mold, by hand means agitating said liquid mixture in a combing motion to disperse and orient said pearlescent pigment, forming a pattern of choice, and suspending said combing operation as soon as the increase in the resin viscosity indicates that the gel stage is reached, thus permitting the pattern be permanently fixed into the resin.

Introducing mother of pearl flakes into the liquid catalyzed modified resin that has been poured into the mold, forming a pattern of choice before the increase in the resin viscosity indicates the gel stage is reached, and timing said increase in viscosity by means of accelerator and catalyst to resin ratios and operating temperature.

Mixing a small amount of white polyester paste with the liquid catalyzed modified resin forming a translucent mixture, pouring said mixture into the mold and marking black veins into said mixture by means of a fine pointed instrument tipped with black polyester paste to simulate a marble surface.

If a deeper three-dimensional decorative effect is desired this may be accomplished by means of successive layers poured in each mold on top of a last cured plastic or by forming a first transparent layer and the first decorative layer on top of same.

If an opaque layer is required to form the background for the decorative effect the liquid catalyzed modified resin is mixed with an opaque pigment before pouring into the mold or into the cavity.

These methods of obtaining deep three-dimensional effects, and examples of suitable "liquid catalyzed modified resins" amenable to being cast and cured without external application of heat or pressure are described in my co-pending application Serial No. 251,420, filed January 14, 1963, which is a division of said Patent No. 3,072,973. The specifications thereof disclose liquid catalyzed casting resins and monomers useful therein, including epoxy, polyester, styrene, and methyl methacrylate. One of the examples given in the patent and application is of conventional thermosetting polyester resin, accelerator, and catalyst for mixing prior to use, the materials including 6 qts. of polyester resin, 3.5 oz. of MEK-peroxide, 0.25 oz. cobalt and 0.5 qt. of purified styrene.

This method may also be used to envelope a core or to form a foam core into the cavity as has previously been indicated in the description of the general methods that embrace this invention.

Now in reference to the continuous production of said articles, FIGURE 6 depicts an apparatus useful for said purpose.

Two opposite leveled platforms 11 permit two identical flexible conveyors 12 having a shape illustrated as an example in FIGURE 7 to travel along their flat surfaces at a constant speed and converge toward a lower central section. This flexible conveyor 12 resembles an open half-rectangle inner cross-section with a mortise edge providing a continuous open top mold having an upper surface which forms the mold bottom conforming to the desired exterior surface finish of the article and two sides that form the mold walls. These conveyors may be endless but in the example two rolls are illustrated emerging from feeding spools 13 and received by take-up spools 14, guided in their travel along the leveled platforms by pressure plates or rollers applied downward over their mortise edges on both sides of said platforms, not shown in FIGURE 6, to maintain said conveyors flat and in close contact with the platform surfaces. Guiding rolls 15 and 17, drums 16 and the lower central section 22 provide auxiliary means to insure a smooth travel of the conveyors through the different sections of the apparatus.

In the event that these conveyors do not comprise a self-releasing component it will be necessary to provide means to apply a release coat to the inner section of said conveyors before the resin is poured.

In some instances working with low viscosity resins, it will be necessary to form a closed side into the conveyor under the leveling device 20 by means of a flexible piece inserted across the inner section of each conveyor forming the beginning of the liquid layer and preventing said resin to run freely. These pieces are illustrated in 26 of FIGURE 6.

In order to conduct the process, the conveyor is started, then constant identical amounts of liquid catalyzed modified resin 19 are poured into the moving conveyor molds 12 by means of upper dispensers 18 to a substantially equal partial depth in both molds and leveled by means of device 20. The layers formed are passed through heating chambers 21 to accelerate the curing of said layers so as to emerge from said heating chambers in a substantially hard but flexible stage. These opposite still flexible and semi-cured plastic layers converge into a lower central vertical funnel-shaped hopper section 22 by means of drum 16 having a diameter adapted to permit the layers to temporarily adopt said curved shape without deterioration. The conveyors while passing along said lower central vertical funnel-shaped hopper section (depicted in FIGURE 8 in a fragmentary partly sectional front view and in FIGURE 9 in a fragmentary partly sectional side view showing the cavity through a center line that corresponds to the contact points of the mold walls), become closer one to the other until they enter the lower central vertical straight portion of said section wherein both conveyors come into close contact by their respective mold wall gaskets (as illustrated in FIGURE 10, which is a cross section view of FIGURE 9 through line X—X), to form a cavity having a rectangular inner cross-section and having lower and upper openings, said cavity limited by the inner surfaces of the semi cured plastic layers and a portion of the mold wall gaskets.

In order to form a first cavity with only one upper open section, a flexible plug is inserted across and into at least one of said conveyors on top of the plastic layer so that when the conveyors during their downward travel reach said straight portion one cavity will be formed continuously and will be ready to be constantly filled with liquid catalyzed modified resin 24 by means of an upper dispenser 23. This plug that forms the beginning of the central plastic layer is illustrated at 27 in FIGURE 6.

After this continuously formed cavity is filled with the liquid catalyzed resin the conveyors pass in their downward travel through a heating chamber 25 wherein this last poured resin as well as the other semi cured layers are completely hardened and cured so that the emerging article at the bottom of said lower central vertical section may be cut to the desired length.

At that bottom section means not shown in FIGURE 6 are provided to release the article from the conveyors and to guide and cut the finished emerging article.

The finished article emerging from said apparatus will show two finished surfaces and the general exterior appearance of a solid seamless plastic article as illustrated in FIGURE 5.

As it was described for the stationery method, this continuous process permits articles wholly transparent, translucent, partially transparent, clear, colored or opaque, and also having a deep three-dimensional effect in at least one of the layers formed in the horizontal position using the same techniques before the liquid resin layers enter the heating chambers 21.

The continuous envelopment of a core or reinforcing material will only require means to introduce, align and secure the core or reinforcing material into the cavity while the resin is constantly being poured.

Finally, a continuous foam core formed into the cavity will comprise the use of a foaming resin, catalyst and blowing agents.

What is claimed is:

1. The method of producing warp-free plastic articles having isotropic and balanced properties comprising the steps of (A) introducing substantially equal quantities of a flowable material curable to a solid resin into two identical leveled shallow open molds having mold bottoms, which conform to the desired exterior surface finishes of the article, said bottoms having upstanding gaskets attached thereto, said molds having a combined total depth determined by the combined height of the gaskets that corresponds to the thickness of the article, said quantities being such that the said material partially fills said molds, permitting said quantities of said material to cure until set (B) tilting both molds to a vertical position and joining the molds so that the mold gaskets positioned therebetween come into close contact forming a closed mold with a leak-proof cavity limited by the two set inner surfaces and the corresponding gaskets, securing the closed mold in the vertical position, and aligning the molds so that the outer surfaces of the two first set layers that form the two finished surfaces of the article are mutually parallel (C) introducing into said cavity, by means of an opening that has previously been provided in at least one section of the closed mold material including sufficient flowable material curable to a solid resin to completely fill the cavity, permitting the air to escape through an uppermost slot and the material in the cavity to cure and self-bond to the adjacent layers until set, thereby forming a balanced article of equal stress and isotropic with two finished plastic surfaces.

2. The method of claim 1 in which decorative media is introduced into at least one of said quantities of said flowable material.

3. The method of claim 1 in which the material introduced into said cavity includes a core material.

4. The method of continuously producing plastic articles having isotropic and balanced properties which comprises, (A) continuously introducing at the same time rate substantially equal quantities of polymerizable liquid as layers into two moving leveled shallow open molds formed by two identical opposite conveyors formed by flexible matter having inner cross-sectional shape in the form of an open half-rectangle, having bottoms conforming to the desired exterior surface finishes of the article and a combined total inner depth that corresponds to the thickness of the final article, (B) continuously moving said conveyors horizontally toward one another, (C) leveling the liquid layers on both conveyors so as to only partially fill said molds, (D) subjecting said liquid layers to accelerated curing during the horizontal movement of said conveyors and curing to a point where said liquid is set but flexible, (E) changing the direction of movement of said conveyors and flexible layers so that they are moving vertically downward and at the same time bringing said conveyors into sealing relationship such that the inner cross-sectional shape is in the form of a two section closed rectangle, said closed mold forming a cavity with the inner plastic layers and having upper and lower open sections, (F) plugging the cavity to form a leakproof closure so that when said closed mold has traveled a given length downwardly there will be formed continuously a cavity having an upper opening, (G) continuously introducing at the same time rate from an upper position material including sufficient polymerizable liquid into said continuously forming cavity to maintain said cavity completely filled, (H) subjecting said last introduced liquid to accelerated curing conditions during the downward travel of the conveyors, permitting said last liquid to cure and self-bond to the adjacent plastic layers, and (I) stripping said conveyors from the final article.

5. The method of claim 4 in which decorative media is introduced into at least one of said quantities of polymerizable liquid.

6. The method of claim 4 in which the material introduced into said cavity includes a foamed plastic.

7. The method of claim 4 in which the material introduced into said cavity includes a core material.

8. An article comprising a rigid seamless integral unitary body having two identical parallel hardened outer layers and an inner layer, the layers being self-bonded plastic, the plastic of the outer portions of the said outer layers having superior strength properties compared with the plastic of the inner portions of said outer layers, and the product is unitary, seamless, equally balanced, warp-free and isotropic, made by the method of claim 1.

9. Apparatus for forming isotropic articles having plastic surfaces comprising two identical shallow open-topped molds having means defining mold bottoms, flexible gaskets attached to said mold bottoms in such a manner that said gaskets and bottoms together form said molds, means for retaining said molds substantially horizontally at the same level and in a fixed relationship to one another, means for placing and fixing said molds in a vertical position with the gaskets of each mold in sealing contact with the gaskets of the other mold to define a mold cavity, and means for introducing materials into said cavity.

10. The apparatus of claim 9 having means on parallel axes to pivot said molds from said horizontal position to said vertical position.

11. The apparatus of claim 9 in which said means defining the mold bottoms comprise elongated flexible belts.

References Cited by the Examiner

UNITED STATES PATENTS

| | | | |
|---|---|---|---|
| 2,084,113 | 6/1937 | Sherts | 264—261 |
| 2,332,559 | 10/1943 | Daly et al. | 264—308 XR |
| 2,444,533 | 7/1948 | Richardson | 264—255 XR |
| 2,502,926 | 4/1950 | Chadwich et al. | 264—79 XR |
| 2,748,042 | 5/1956 | Borgese | 161—165 |
| 2,812,279 | 11/1957 | Nadeau | 161—165 |
| 3,139,369 | 6/1964 | Sullivan et al. | 156—79 XR |
| 3,135,645 | 6/1964 | Burkley et al. | 161—165 |

FOREIGN PATENTS

| | | |
|---|---|---|
| 836,894 | 1/1939 | France. |
| 852,380 | 10/1960 | Great Britain. |
| 882,296 | 11/1961 | Great Britain. |
| 80,385 | 6/1952 | Norway. |

ALEXANDER H. BRODMERKEL, *Primary Examiner.*

ROBERT F. WHITE, *Examiner.*

P. E. ANDERSON, *Assistant Examiner.*